May 20, 1924.
L. A. ALTIERI
1,494,526
DIRECTION INDICATOR
Filed Jan. 4 1922
2 Sheets—Sheet 1
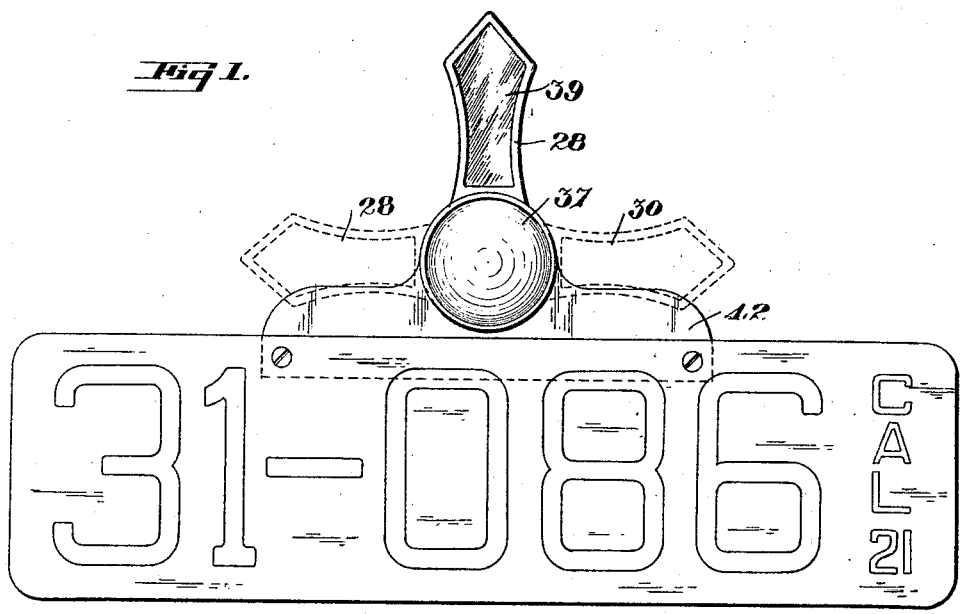
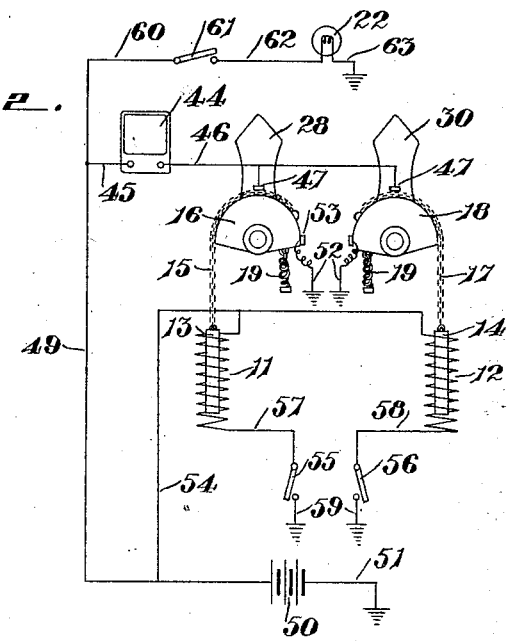
INVENTOR
LOUIS A. ALTIERI.
BY Chas. E. Townsend
ATTORNEY.

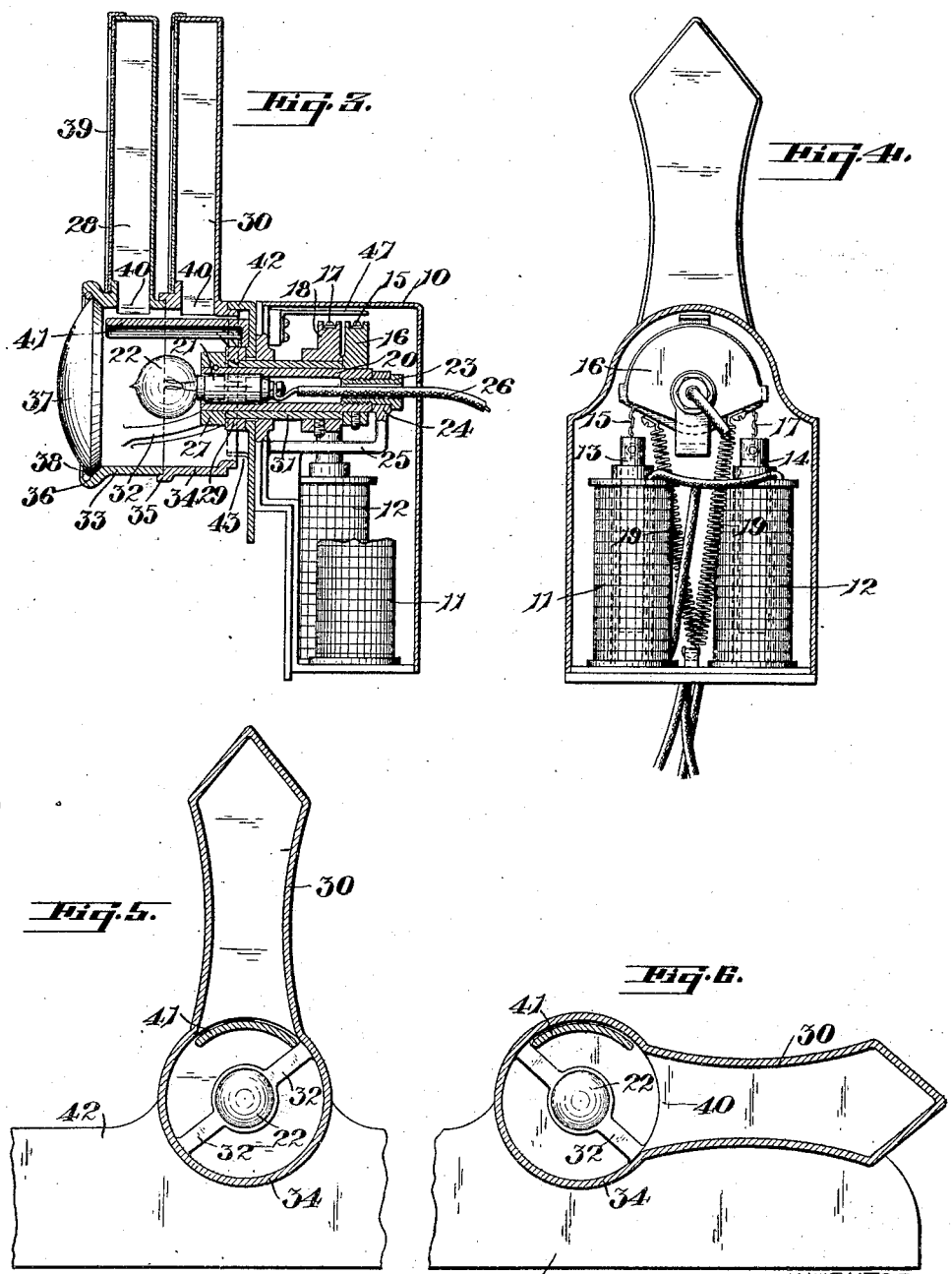

Patented May 20, 1924.

1,494,526

UNITED STATES PATENT OFFICE.

LOUIS A. ALTIERI, OF SAN FRANCISCO, CALIFORNIA.

DIRECTION INDICATOR.

Application filed January 4, 1922. Serial No. 526,932.

*To all whom it may concern:*

Be it known that I, LOUIS A. ALTIERI, a citizen of the United States, residing at the city and county of San Francisco and State of California, have invented new and useful Improvements in Direction Indicators, of which the following is a specification.

This invention relates to direction indicators, and particularly pertains to an indicator for vehicles.

It is the principal object of the present invention to provide an indicator applicable to vehicles, and by the use of which the intended course of travel or interruption of travel of the vehicle may be indicated, and at the same time audibly advising the driver of the vehicle when the device is properly operating.

The present invention contemplates the use of a pair of semaphore arms adapted to be alternately or simultaneously operated by a selective mechanism, to be automatically illuminated at the instant of operation only, and which arms will close the circuit of an audible signal when they are standing in their signalling positions.

The invention is illustrated by way of example in the accompanying drawings, in which:

Fig. 1 is a view in elevation showing the complete device.

Fig. 2 is a schematic view showing the principal elements of the invention, and further indicating a wiring diagram.

Fig. 3 is an enlarged view in central vertical section through the indicator.

Fig. 4 is an enlarged view in transverse section through the operating mechanism of the indicator.

Figs. 5 and 6 are fragmentary views in section and elevation showing the manner in which the arms are automatically illuminated.

Referring more particularly to the drawings, 10 indicates a housing inclosing a pair of solenoid magnets 11 and 12. These members are disposed parallel and vertically, being fitted with plungers 13 and 14, respectively. The plunger 13 is secured to a flexible connection 15 which is led around a pulley segment 16. The plunger 14 is secured to a flexible connection 17 which is led around a pulley segment 18. These segments are adapted to oscillate around a common center, and as more clearly shown in Fig. 2, are intended to swing in opposite directions. Springs 19 normally hold the segments in a central normal position.

The segment 16 is fixed to a tubular shaft 20 which extends horizontally through the front wall of the case 10. This shaft is fitted with a lamp socket 21 at its forward end to receive an incandescent light bulb 22. A tubular plug 23 is threaded into the rear end of the shaft and passes through bearing 24 carried by an arm 25. The central opening of this plug accommodates an electric conduit 26 leading to the socket 12. The plug is formed at its outer end with an enlarged collar portion resting against the end face of the bearing 24, thus preventing forward longitudinal movement of the shaft 20.

A hub 27 of a semaphore arm 28 is secured to the opposite end of the tubular shaft 20 and rests against a hub 29 of a semaphore arm 30. These hubs cooperate with the shoulder of the plug 23 to prevent any objectionable longitudinal movement of the shaft 20. The hub 29 is formed with a tubular extension 31, through which the shaft 20 is rotatably mounted. The pulley segment 18 is secured upon the rear end of the extension 31 and thus moves therewith. The hubs 27 and 29 are formed with arms 32 which extend outwardly and forwardly. These arms are preferably cast integral with cylindrical cases 33 and 34, respectively. The case 33 forms the lower portion of semaphore arm 28, while the case 34 performs a similar function for the arm 30. As shown in Fig. 3 the rear case 34 has an enlarged lip and counterbore portion 35 into which the cylindrical edge of the case 33 may project.

The case 33 is formed at its outer edge with an enlarged lip 36 which serves as a mounting for a tail light glass 37. This glass is held in place by an expanding ring 38. The semaphore arms are hollow and are substantially in the form of arrows. The front faces of these arms are fitted with translucent screens 39, as for example, red colored glass or celluloid. Due to the construction here shown it is possible for either of the semaphore arms to be swung from their normal vertical positions to horizontal signalling positions as indicated by dotted lines in Fig. 1, and it is desirable that the arms shall be illuminated when moved to their signalling positions, at which time light rays from the lamp 22 will be projected through openings 40 in the semaphores 33 and 34 and will tend to illuminate the arms as the light shines through the screens 39. When the semaphore arms are in their non-signalling positions a shutter 41 is disposed across the openings 40 to prevent the arms from being illuminated. This shutter is arcuate in section and is fixed to a plate 42, which plate is in turn secured to the rear face of the case 10. The plate 42 is provided as a mounting for a license plate as indicated in Fig. 1. This license plate is illuminated from the lamp 20 through a light opening 43 which occurs between the rear edge of the semaphore member 34 and the face of the plate 42. It is to be understood that at night the lamp 22 will continuously burn, thus illuminating the tail light lens 37, the license plate and the semaphore arms, in the event that these arms are swung to horizontal positions.

It is desirable to positively indicate when the device is in a signalling position so that the operator may be certain that a signal is being produced. This is of special value when the signal device is placed at the rear of the vehicle and cannot be observed by the driver. For that reason an audible signal is here provided, although visible means might readily be used if desired. The audible signal consists of an electric buzzer 44. It will readily be understood that a lamp might be substituted therefor. In either event, connections 45 and 46 are secured to the binding posts of the signal member. The connection 46 leads to a pair of fixed contacts 47 and 48. Connection 45 is secured to a lead wire 49 communicating with a battery 50 or other source of electric supply. The other pole of the battery is grounded by a wire 51.

Ground wires 52 are secured to the pulley segments 16 and 18, while contacts 53 are secured to the segments and are adapted to register with the fixed contacts 47, when the respective semaphore has moved to a signalling position, thus completing the control circuit through the member 44. The control circuit of the complete signal device comprises a lead wire 54 connecting the battery 50 with solenoid 11 and solenoid 12. The opposite poles of the solenoids are separately connected with switches 55 and 56, respectively, by wires 57 and 58. The opposite poles of the switches are grounded as indicated at 59. The light 22 is in an electric circuit comprising a conductor 60 secured to a switch 61, and by which a circuit may be completed to the light along a conductor 62. A return circuit is made through wire 63.

In operation of the present invention the device is secured to the rear of a vehicle, and in a position so that the lens 37 will serve as a tail light and a license plate will be properly displayed. When a turn of the vehicle is to be negotiated to one side of the roadway, the corresponding switch 55 or 56 is closed. This will cause a circuit to be established through solenoid 11 or 12, which in turn will rotate the pulley segment and swing the associated semaphore arm downwardly to a horizontal position. As this position is reached the opening 40 in the arm will move around the shutter 41 and will eventually assume a position unobstructed from the lamp by the shutter. At this time the semaphore arm will be illuminated.

The semaphore arm will be held in its signalling position so long as the switch is closed. When the electric circuit is broken, however, the spring connected with the pulley segment will cause the arm to be swung to its vertical and non-signalling position. During this swinging movement the light opening 40 will be moved to register with the fixed shutter 41, thus interposing the shutter between the opening and the light bulb, and thereby discontinuing the illumination of the arm.

When a stop is to be negotiated, both switches 55 and 56 are simultaneously closed, causing the two arms to swing outwardly in opposite directions to assume horizontal positions. When an arm swings to a horizontal position the contacts 47 and 53 are brought to register, thus closing the electric circuit through the buzzer or lamp 44. This will positively indicate to the driver that a signalling arm is in its horizontal position and will relieve all uncertainty as to the probability of the operation of the device.

It will thus be seen that the invention here disclosed provides simple means for automatically illuminating semaphore signalling arms as they assume their signalling positions, at the same time indicating to the operator that a signalling position has been reached, the structure also embodying a simple and efficient illuminating means for a vehicle license plate and a tail light.

While I have shown the preferred form of my invention as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A direction indicator comprising a pair of semaphore arms, a cylindrical casing forming a part of each arm and having hubs whereby the arms may be swung about a common axis, said casings co-operating with each other to form a lamp housing, a translucent member in the rear wall of each of the arms, a constant illuminating means inclosed by the lamp housing and intended to illuminate the screens of the arms, and a shield normally preventing the rays of light from the illuminating means from reaching the translucent screens when the arms are in a non-signalling position, and which will permit the screens to be illuminated when the arms have moved to a signalling position.

2. A direction indicator comprising a pair of semaphore arms, a cylindrical casing forming a part of each arm and having hubs whereby the arms may be swung about a common axis, said casings co-operating with each other to form a lamp housing, a translucent screen forming one wall of each of the arms, a constant illuminating means inclosed by the lamp housing and intended to illuminate the screens of the arms, a shield normally preventing the rays of light from the illuminating means from reaching the translucent screens when the arms are in a non-signalling position, and which will permit the screens to be illuminated when the arms have moved to a signalling position and a tail light lense carried by the casing of the outermost arm, and adapted to be constantly illuminated by said illuminated means.

3. A direction indicator comprising a pair of semaphore arms, a cylindrical casing forming a part of each arm and having hubs whereby the arms may be swung about a common axis, said casings co-operating with each other to form a lamp housing, a translucent screen forming one wall of each of the arms, a constant illuminating means inclosed by the lamp housing and intended to illuminate the screens of the arms, a shield normally preventing the rays of light from the illuminating means from reaching the translucent screens when the arms are in a non-signalling position, and which will permit the screens to be illuminated when the arms have moved to a signalling position, and means for selectively actuating said arms.

4. A direction indicator comprising a pair of semaphore arms adapted to swing in parallel planes around a common center, each of said arms having one face formed of translucent material, a cylindrical casing on each arm adapted to cooperate with each other to form a lamp housing, a hub formed as a part of each casing, the same constituting pivotal supports for the arms and casings, a constantly illuminated lamp supported in the lamp housing and means whereby movement of either of the arms to its signaling position will permit it to be illuminated by the lamp and prevent illumination of the arms when in their non-signaling position.

5. A direction indicator comprising a pair of semaphore arms adapted to swing in parallel planes around a common center, each of said arms having one face formed of translucent material, cylindrical casings mounted at the lower end of the arms concentric to the center about which they swing, said casings being turnably connected and constituting a lamp housing, hub members carried by said casings, bearing sleeves upon which said hubs are mounted, a constantly illuminated lamp supported by said sleeves and a fixed member mounted in the lamp housing in a position whereby movement of either of the arms to its signaling position will permit it to be illuminated by the lamp, and prevent illumination of the arms when in their non-signaling positions.

6. A direction indicator comprising a pair of semaphore arms adapted to swing about a common center in opposite directions, one wall of each arm being formed of translucent material, a cylindrical casing fixed to each arm at the lower end thereof and concentric with the center about which the arms swing, said casings being turnably connected and constituting a lamp housing, a lamp mounted in said housing for illuminating said arms, hubs carried by the casings, telescoping sleeves, said hubs being fixed one on each of the sleeves, said sleeves constituting the pivotal mounting for the arms, and means for selectively imparting swinging movement to the arms.

7. A direction indicator comprising a pair of semaphore arms adapted to swing about a common center in opposite directions, one wall of each arm being formed of translucent material, a cylindrical casing fixed to each arm at the lower end thereof and concentric with the center about which the arms swing, said casing being turnably connected and constituting a lamp housing, a lamp mounted in said housing for illuminating said arms, hubs carried by the casings, telescoping sleeves, said hubs being fixed one on each of the sleeves, said sleeves constituting the pivotal mounting for the arms, a segment fixed on each sleeve, an electromagnet associated with each segment and operatively connected therewith, and selective means for energizing said magnets.

LOUIS A. ALTIERI.